(12) United States Patent
Arad et al.

(10) Patent No.: US 7,948,976 B2
(45) Date of Patent: May 24, 2011

(54) EFFICIENT MANAGEMENT OF QUEUEING RESOURCES FOR SWITCHES

(75) Inventors: Carmi Arad, Nofit (IL); Yaniv Kopelman, Holon (IL); Aviran Kadosh, Misgav (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 1195 days.

(21) Appl. No.: 11/412,265

(22) Filed: Apr. 26, 2006

(65) Prior Publication Data
US 2007/0253411 A1    Nov. 1, 2007

(51) Int. Cl.
*H04L 12/56* (2006.01)
*G06F 5/12* (2006.01)

(52) U.S. Cl. ............. 370/389; 370/412; 710/52; 710/57

(58) Field of Classification Search .................. 370/229, 370/230, 389, 392, 412, 418–423, 428, 429; 710/52, 53, 56, 57
See application file for complete search history.

(56) References Cited

U.S. PATENT DOCUMENTS

| | | | | |
|---|---|---|---|---|
| 5,901,139 A | * | 5/1999 | Shinohara | 370/232 |
| 6,034,945 A | * | 3/2000 | Hughes et al. | 370/230 |
| 6,377,546 B1 | * | 4/2002 | Guerin et al. | 370/230 |
| 6,504,818 B1 | * | 1/2003 | Levine | 370/229 |
| 6,625,159 B1 | * | 9/2003 | Singh et al. | 370/413 |
| 7,286,485 B1 | * | 10/2007 | Ouellette et al. | 370/252 |
| 2001/0053149 A1 | * | 12/2001 | Mo et al. | 370/389 |
| 2004/0042477 A1 | * | 3/2004 | Bitar et al. | 370/412 |
| 2004/0114616 A1 | * | 6/2004 | Wang | 370/412 |
| 2006/0209865 A1 | * | 9/2006 | Lee | 370/419 |
| 2006/0248242 A1 | * | 11/2006 | Andersen et al. | 710/52 |
| 2007/0104211 A1 | * | 5/2007 | Opsasnick | 370/412 |

* cited by examiner

*Primary Examiner* — Pankaj Kumar
*Assistant Examiner* — Saba Tsegaye

(57) ABSTRACT

Resources allocated to a group of ports include a plurality of storage regions. Each storage region includes a committed area and a shared area. A destination storage region is identified for a packet. A packet queuing engine stores the packet in the committed area of the determined destination storage region if it has a first drop precedence value, and if available storage space in the committed area exceeds a first threshold. The packet queuing engine stores the packet in the shared area of the determined destination storage region if the packet is not stored in the committed area, and if available storage space exceeds a second threshold defined by the packet's drop precedence value. If the packet is not stored either in the committed or shared area, it may be dropped.

40 Claims, 5 Drawing Sheets

EFFICIENT MANAGEMENT OF QUEUEING RESOURCES FOR SWITCHES

BACKGROUND OF THE INVENTION

Packet processors perform various functions in data networks. These functions may require a packet processor to temporarily store a copy of a data packet while other processing is performed. If insufficient resources are available, the packet processor may be unable to store the data packet and the data packet may be dropped.

Different levels of service may be provided based upon properties of data packets. For example, a packet processor may assign a higher level of service to data packets representing interactive traffic than to data packets representing bulk file transfers. Similarly, the packet processor may guarantee a specified bandwidth to some types of traffic and may limit the bandwidth available to other types of traffic.

As the number and size of data networks has increased, demand for packet processors that can operate at high data rates while providing differential services support has grown. This demand for increased performance and differential services support has highlighted the need to use packet processor resources efficiently. The present invention addresses this need.

BRIEF SUMMARY OF THE INVENTION

According to one embodiment of the present invention, a method of processing data packets is disclosed. The method includes receiving a packet characterized by a drop precedence value and determining a destination storage region for storing the packet. The destination storage region is associated with a group of ports. The method includes storing the packet in a committed area of the determined destination storage region if the packet has a first drop precedence value and if an available storage space in the committed area is greater than a first threshold. The method further includes storing the packet in a shared area of the determined destination storage region if the packet is not stored in the committed area and if an available storage space in the shared area is greater than a second threshold defined by the packet's drop precedence value. A packet that is not stored in either the committed area or the shared area of the determined destination storage region may be dropped. In some embodiments, determining a destination storage region for storing the packet is based upon a traffic class value of the packet and the traffic class value is one of N different traffic class values.

According to other embodiments, the method includes maintaining a global count representative of a size of packets stored in all storage regions, comparing the global count to a global threshold if the packet is to be stored in either the committed area or the shared area of the determined destination storage region, dropping the packet if the global count exceeds the global threshold, and updating the global count if the packet is stored in the committed area or the shared area of the destination storage region. In yet other embodiments, the method includes maintaining a global shared count representative of a size of packets stored in the shared area of each storage region associated with the group of ports and comparing the global shared count to a global shared threshold if the packet is to be stored in the shared area of the determined destination storage region. The method also includes dropping the packet if the global shared count exceeds the global shared threshold and updating the global shared count if the packet is stored in the shared area of the determined destination storage region.

According to further embodiments, the method includes forming N groups from packets stored in the shared area of each storage region associated with the group of ports according to the traffic class of each packet, forming N counts each representative of a size of packets in a different one of the N groups, comparing a count from the N counts to a predetermined threshold, and dropping the packet if the count exceeds the predetermined threshold value and the packet is to be stored in the shared area of the determined destination storage region. The method also includes updating the count if the packet is stored in the shared area of the determined destination storage region.

In still further embodiments, available storage space in the committed area is reduced by a size of the packet if the packet is stored in the committed area of the determined destination storage region and available storage space in the shared area is reduced by a size of the packet if the packet is stored in the shared area of the determined destination storage region. Available storage space may be measured in bytes. In some embodiments, storing the packet includes dividing the packet among one or more buffers according to a size of the packet and forming a linked list of the allocated buffers; in other embodiments, storing the packet includes allocating one or more descriptors to the packet.

According to an alternative embodiment of the present invention, a network device for processing data packets is disclosed. The network device includes a plurality of ports and a storage resource associated with the plurality of ports. The storage resource includes a plurality of storage regions. An egress pipeline is configured to determine a destination storage region for storing a packet. The egress pipeline includes a packet queuing engine configured to store the packet in a committed area of the determined destination storage region if the packet has a first drop precedence value and if an available storage space in the committed area is greater than a first threshold. The packet queuing engine is further configured to store the packet in a shared area of the determined destination storage region if the packet is not stored in the committed area and if an available storage space in the shared area is greater than a second threshold defined by the packet's drop precedence value. A packet may be dropped if it is not stored in either the committed area or the shared area of the destination storage region.

In additional embodiments of the network device, the egress pipeline determines the destination storage region based upon a traffic class value of the packet. The packet may have one of N different traffic class values. In other embodiments, the packet queuing engine is further configured to maintain a global count representative of a size of all packets stored in all storage regions and to compare the global count to a global threshold if the packet is to be stored in the committed area or the shared area of the determined destination storage region. The packet queuing engine is further configured to drop the packet if the global count exceeds the global threshold and to update the global count if the packet is stored in the committed or shared area of the determined destination storage region. In yet other embodiments, the packet queuing engine is further configured to maintain a global shared count representative of a size of packets stored in the shared area of each storage region associated with the group of ports and to compare the global shared count to a global shared threshold if the packet is to be stored in the shared area of the determined destination storage region. The packet queuing engine is also configured to drop the packet if the global shared count exceeds the global shared threshold and to update the global shared count if the packet is stored in the shared area of the determined destination storage region.

In further embodiments of the network device, the packet queuing engine is configured to form N groups from packets stored in the shared area of each storage region according to traffic class value and to form N counts each representative of a size of packets in a different one of the N groups of packets. The packet queuing engine is also configured to compare a count from the N counts to a predetermined threshold, to drop the packet if the count exceeds the predetermined threshold value and the packet is to be stored in the shared area of the determined destination storage region, and to update the count if the packet is stored in the shared area of the determined destination storage region.

In still further embodiments of the network device, available storage space in the committed area of the determined destination storage region is reduced by a size of the packet if the packet is stored in the committed area of the determined destination storage region, and available storage space in the shared area of the determined destination storage region is reduced by the size of the packet if the packet is stored in the shared area of the determined destination storage region. Available storage space may be measured in bytes. In other embodiments, the storage resource allocated to the plurality of ports includes buffers, and a packet is stored by allocating one or more buffers according to a size of the packet and forming a linked list of the allocated buffers. In a further embodiment, the storage resource allocated to the plurality of ports includes descriptors and a packet is stored by creating one or more descriptors associated with the packet.

According to another embodiment of the present invention, a network device for processing data packets is disclosed. The network device includes means for receiving a packet characterized by a drop precedence value and means for determining a destination storage region for storing the packet. The destination storage region is associated with a group of ports. The network device further includes means for storing the packet in a committed area of the determined destination storage region if the packet has a first drop precedence value and if an available storage space in the committed area is greater than a first threshold. The network device also provides means for storing the packet in a shared area of the determined destination storage region if the packet is not stored in the committed area and if an available storage space in the shared area is greater than a second threshold defined by the packet's drop precedence value. A packet that is not stored in either the committed area or the shared area of the determined destination storage region may be dropped. In some embodiments, determining a destination storage region for storing the packet is based upon a traffic class value of the packet and the traffic class value is one of N different traffic class values.

According to other embodiments, the network device includes means for maintaining a global count representative of a size of packets stored in all storage regions, means for comparing the global count to a global threshold if the packet is to be stored in either the committed area or the shared area of the determined destination storage region, means for dropping the packet if the global count exceeds the global threshold, and means for updating the global count if the packet is stored in the committed area or the shared area of the destination storage region. In yet other embodiments, the network device includes means for maintaining a global shared count representative of a size of packets stored in the shared area of each storage region associated with the group of ports and means for comparing the global shared count to a global shared threshold if the packet is to be stored in the shared area of the determined destination storage region. The network device may also include means for dropping the packet if the global shared count exceeds the global shared threshold and means for updating the global shared count if the packet is stored in the shared area of the determined destination storage region.

According to further embodiments, the network device includes means for forming N groups from packets stored in the shared area of each storage region associated with the group of ports according to the traffic class of each packet, means for forming N counts each representative of a size of packets in a different one of the N groups, means for comparing a count from the N counts to a predetermined threshold, and means for dropping the packet if the count exceeds the predetermined threshold value and the packet is to be stored in the shared area of the determined destination storage region. The network device also includes means for updating the count if the packet is stored in the shared area of the determined destination storage region.

In still further embodiments, available storage space in the committed area is reduced by a size of the packet if the packet is stored in the committed area of the determined destination storage region and available storage space in the shared area is reduced by a size of the packet if the packet is stored in the shared area of the determined destination storage region. Available storage space may be measured in bytes. In some embodiments, means for storing the packet further includes means for dividing the packet among one or more buffers according to a size of the packet and means for forming a linked list of the allocated buffers; in other embodiments, means for storing the packet includes means for allocating one or more descriptors to the packet.

According to another embodiment of the present invention, a computer program for use by a processor for processing data packets is disclosed. The computer program includes instructions that are executable by a processor and that are stored on a non-transitory computer-readable storage medium, e.g., that are stored on one or more storage regions of a network device for processing data packets. The computer program includes code for receiving a packet characterized by a drop precedence value and code for determining a destination storage region for storing the packet. The destination storage region is associated with a group of ports. The computer program further includes code for storing the packet in a committed area of the determined destination storage region if the packet has a first drop precedence value and if an available storage space in the committed area is greater than a first threshold. The computer program also provides code for storing the packet in a shared area of the determined destination storage region if the packet is not stored in the committed area and if an available storage space in the shared area is greater than a second threshold defined by the packet's drop precedence value. A packet that is not stored in either the committed area or the shared area of the determined destination storage region may be dropped. In some embodiments, determining a destination storage region for storing the packet is based upon a traffic class value of the packet and the traffic class value is one of N different traffic class values.

According to other embodiments, the computer program includes code for maintaining a global count representative of a size of packets stored in all storage regions, code for comparing the global count to a global threshold if the packet is to be stored in either the committed area or the shared area of the determined destination storage region, code for dropping the packet if the global count exceeds the global threshold, and code for updating the global count if the packet is stored in the committed area or the shared area of the destination storage region. In yet other embodiments, the computer program includes code for maintaining a global shared count representative of a size of packets stored in the shared area of each storage region associated with the group of ports and code for comparing the global shared count to a global shared threshold if the packet is to be stored in the shared area of the determined destination storage region. The computer program may also include code for dropping the packet if the global shared count exceeds the global shared threshold and code for updating the global shared count if the packet is stored in the shared area of the determined destination storage region.

According to further embodiments, the computer program includes code for forming N groups from packets stored in the shared area of each storage region associated with the group of ports according to the traffic class of each packet, code for forming N counts each representative of a size of packets in a different one of the N groups, code for comparing a count from the N counts to a predetermined threshold, and code for dropping the packet if the count exceeds the predetermined threshold value and the packet is to be stored in the shared area of the determined destination storage region. The computer program also includes code for updating the count if the packet is stored in the shared area of the determined destination storage region.

In still further embodiments, available storage space in the committed area is reduced by a size of the packet if the packet is stored in the committed area of the determined destination storage region and the available storage space in the shared area is reduced by a size of the packet if the packet is stored in the shared area of the determined destination storage region. Available storage space may be measured in bytes. In some embodiments, code for storing the packet further includes code for dividing the packet among one or more buffers according to a size of the packet and code for forming a linked list of the allocated buffers; in other embodiments, code for storing the packet includes code for allocating one or more descriptors to the packet.

DETAILED DESCRIPTION OF THE INVENTION

Resources allocated to a group of ports include a plurality of storage regions. Each storage region includes a committed area and a shared area. A destination storage region is identified for a packet. A packet queuing engine stores the packet in the committed area of the determined destination storage region if the packet has a first drop precedence value, and if available storage space in the committed area exceeds a first threshold. The packet queuing engine stores the packet in the shared area of the determined destination storage region if the packet is not stored in the committed area, and if available storage space exceeds a second threshold defined by the packet's drop precedence value. If the packet is not stored either in the committed or shared area, it may be dropped.

Figure 1:
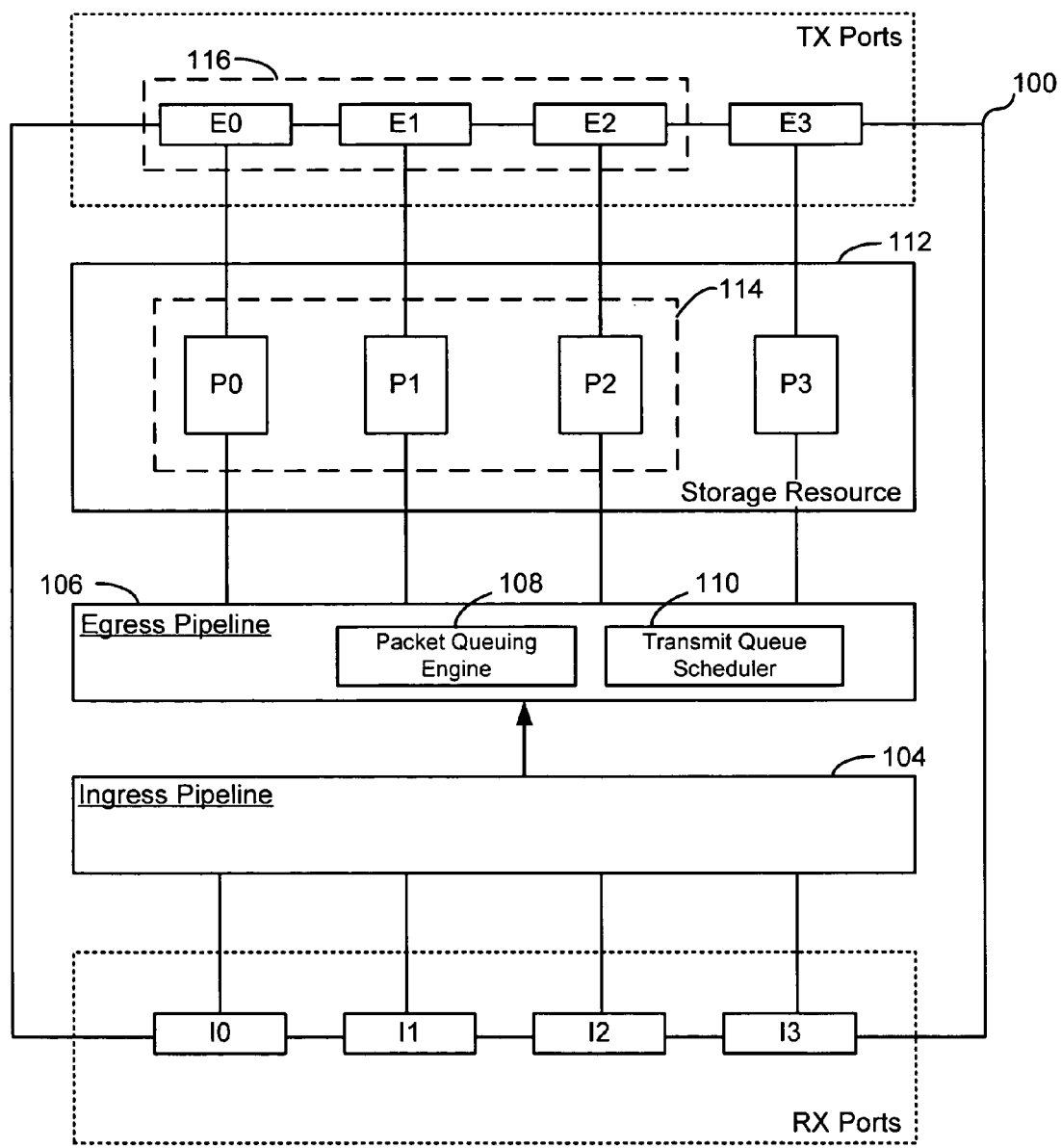
FIG. 1 is a simplified high-level block diagram of a packet processor in accordance with an embodiment of the present invention.

FIG. 1 is a simplified high-level block diagram of a packet processor 100 in accordance with an embodiment of the present invention. Packet processor 100 receives data packets at any of the ingress ports I0, I1, I2, I3. Packets received at the ingress ports are processed at various stages of an ingress pipeline 104. The ingress pipeline 104 may set the value of various attributes associated with the data packet. For example, a traffic class and drop precedence value may be assigned to the data packet. In some embodiments, these attributes are included as part of a QoS profile that is assigned to the data packet by various stages (not shown) of ingress pipeline 104. After ingress processing, the data packet may enter an egress pipeline 106 and be scheduled for transmission at an egress port E0, E1, E2, E3. For simplicity, packet processor 100 is shown with four ingress ports I0, I1, I2, I3 and four egress ports E0, E1, E2, E3. However, it is understood that more or fewer than four ports may be used and that the present invention is not limited to a particular number of ingress ports or to a particular number of egress ports. Persons of ordinary skill in the art will therefore understand that the configuration shown is for purposes of illustration only, and that many alternative configurations are possible and within the scope the present invention.

Packet processor 100 maintains information about the priority of each data packet received at an ingress port I0, I1, I2, I3 and uses this information to schedule transmission of the packet at an egress port E0, E1, E2, E3. Priority information may be needed to implement quality of service on a network. For example, a network operator may guarantee to provide a customer with a specified amount of bandwidth for the customer's applications and may further agree to supply a certain quality of service based upon the type of traffic. To support differentiated services, packet processor 100 maintains a traffic class and a drop precedence value for each data packet. These values may be set when the packet is received and altered as the packet passes through the various processing stages. In some embodiments, the packet processor supports eight traffic classes and three drop precedence values.

Figure 2A:
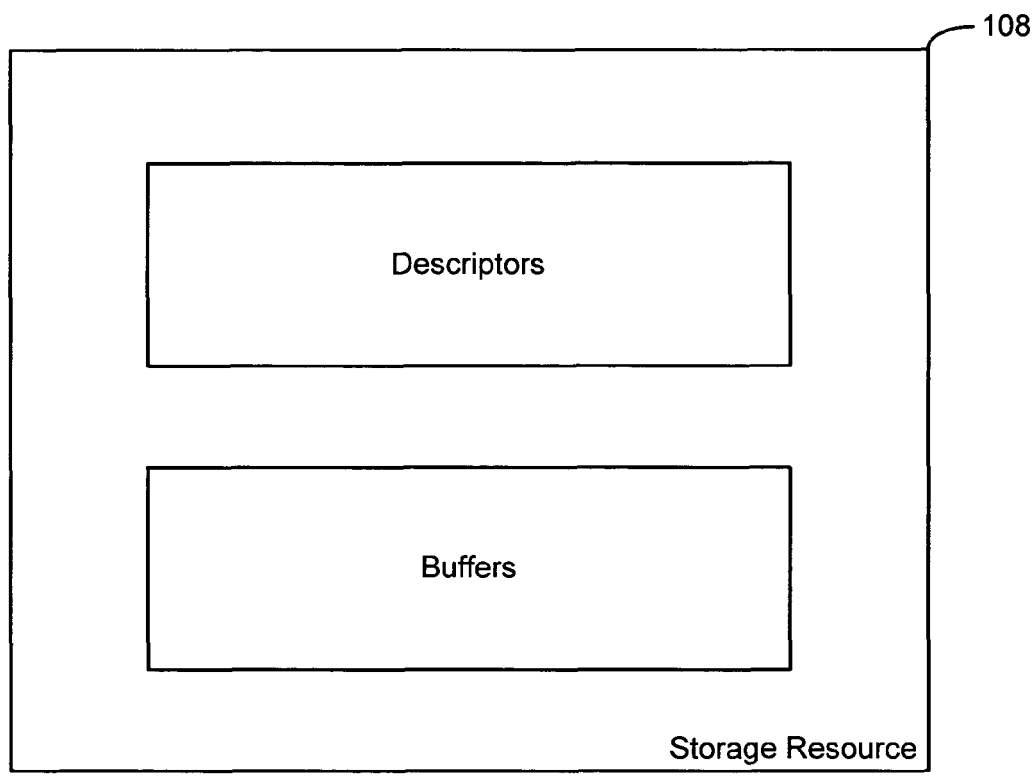
FIG. 2A shows storage resources disposed in the packet processor of FIG. 1.

Packet processor 100 also includes storage resources 112. As shown in FIG. 2A, storage resources 112 may include buffers and descriptors. In some embodiments, fixed-size buffers are dynamically allocated to store a data packet based upon the size of the data packet. Thus, a data packet that is one kilobyte in size might be stored in four 256 byte buffers. In one exemplary embodiment, the packet processor contains 4,000 descriptors and 4,000 buffers where each buffer can hold 256 bytes of data.

Buffers need not be allocated contiguously. To improve efficiency, some embodiments of the network packet processor maintain linked lists of the buffers allocated to data packets. In these embodiments, one or more descriptors may point to a same linked list of buffers. This approach permits the packet processor to schedule multiple copies of the data packet for transmission while allocating only one set of buffers to store the data packet. Descriptors may remain allocated until the copy of the data packet has been transmitted or dropped. Buffers, on the other hand, may remain allocated until all associated descriptors have been released.

Packet processor 100 allocates storage resources 112 at different levels to promote efficiency and to maintain quality of service. At one level, storage resources 112 are allocated to a group of related egress ports 116. For example, individual egress ports may designated for certain types of network traffic and may be arranged to form a logical group of ports. Similarly, ports operating at a same data rate may also be arranged as a group. Thus, at one level, packet processor 100 commits a portion 114 of the storage resources 112 to the group of ports 116. In some embodiments, resources allocated to one group of ports are not available for use by other ports or groups of ports. Similarly, in some embodiments, a group of ports may not exceed its resource allocation or access resources allocated to another group of ports. For each group of egress ports, the network packet processor may maintain a group counter to track resource utilization and a configurable group threshold value.

At a next level, the group storage resources 114 are allocated to individual ports within the group. As shown, each egress port E0, E1, E2 within the group of ports 116 receives a portion P0, P1, P2 of the group storage resources 114. Thus, a first set of storage resources P0 is allocated to E0, a second set of storage resources P1 is allocated to E1, and a third set of storage resources P2 is allocated to E2. The combination of P0, P1, and P2 represents the total resource allocation to the group of egress ports E0, E1, E2. This allocation of group storage resources to individual ports may be performed on a per-port basis. For example, a port-profile may be associated with each egress port that specifies, among other things, the amount of resources allocable to the port. Some embodiments of the present invention support assigning a profile to each egress port selected from among multiple user-configurable profiles.

Figure 2B:
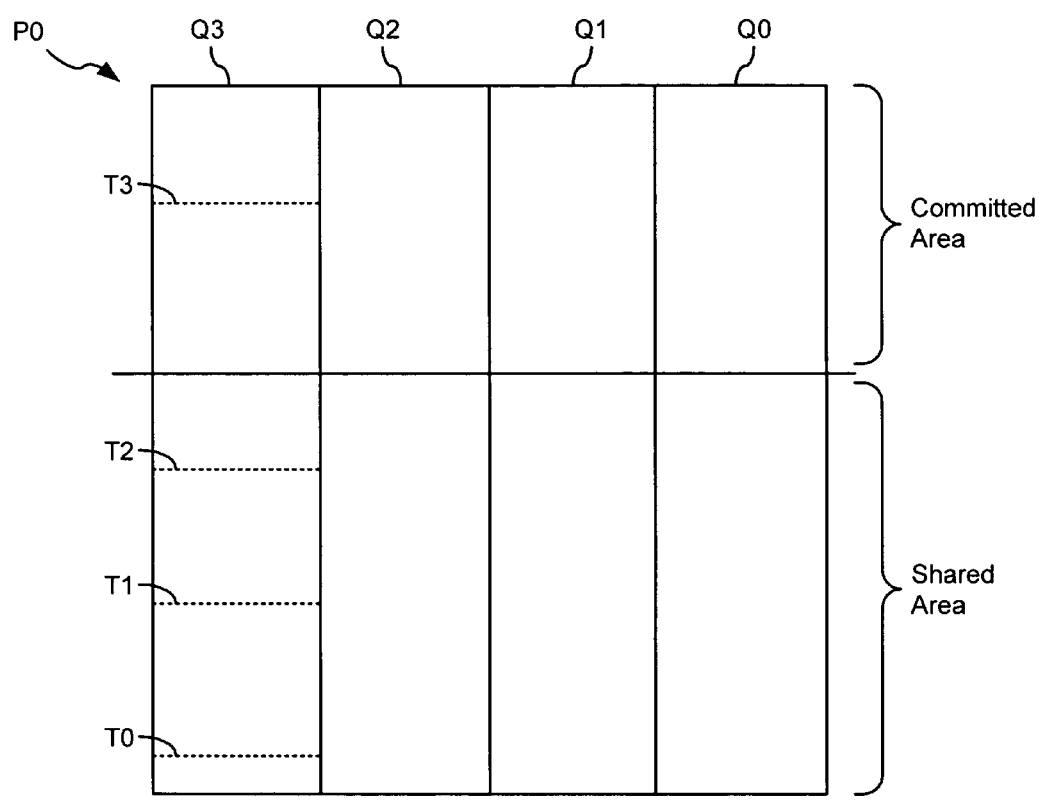
FIG. 2B shows an arrangement of storage resources in accordance with an embodiment of the present invention.

FIG. 2B shows an arrangement of storage resources according to an embodiment of the present invention. At this level, each port storage resource P0, P1, P2, P3 is further divided into storage regions Q0, Q1, Q2, Q3. In some embodiments, there is one storage region for each possible traffic class value. Thus, as shown, a first storage region Q0 may correspond to a first traffic class, a second storage region Q1 may correspond to a second traffic class, a third storage region Q2 may correspond to a third traffic class, and a fourth storage region Q3 may correspond to a fourth traffic class. In an exemplary embodiment, the network packet processor supports a total of eight traffic classes and, correspondingly, each port storage resource may be divided into eight storage regions.

At another level of organization, each storage region established in the port storage resources is further divided into a committed area and a shared area. The packet processor may maintain separate thresholds T0, T1, T2, T3 and counters associated with the committed and shared areas of each storage region. The committed area generally stores only data packets with a lowest drop precedence value. Thus, a separate counter and threshold value are maintained for the committed area of each storage region in the port storage area. When resources are allocated from the committed area of a storage region, the committed area counter associated with that storage region is updated.

By contrast, the shared resource area of a storage region may store packets having any drop precedence value. Therefore, separate counters and separate thresholds corresponding to each drop precedence value may be maintained in connection with the shared area of each storage region. For example, in the shared area of a storage region, a first threshold T0 and a first counter may be maintained for a first drop precedence value, a second threshold T1 and a second counter may be maintained for a second drop precedence value, and a third threshold T2 and a third counter may be maintained for a third drop precedence value. These separate counters may be updated each time resources are allocated from the shared area of the storage region with which they are associated.

In addition to the counters and thresholds described above, the packet processor may maintain a set of group-wide counters and thresholds associated with combined shared-area utilization on a per-storage region (or per-traffic class) basis. These group-wide counters and thresholds are most readily illustrated with simultaneous reference to FIG. 1 and FIG. 2B. As shown, port storage resources P0, P1, and P2 are allocated to the group of egress ports 116 including E0, E1, and E2. In this configuration, the packet processor may maintain separate counters and thresholds associated with the combined shared area resource utilization of E0-Q0, E1-Q0, and E2-Q0. Similarly, the packet processor might maintain a counter and threshold associated with the combined shared area resource utilization of E0-Q1, E1-Q1, and E2-Q1. In like manner, a counter and threshold may be provided for each storage region based on traffic class across all ports in the group of ports 116. These group-wide, shared area counters ($GS_x$) can be expressed mathematically as follows:

$$GS_x = \sum_{k=0}^{n-1} P_k(Q_x) \qquad (1)$$

where:
x=Traffic class
n=Number of ports
$P_k(Q_x)$=Shared-area utilization at storage region x of port storage resource k.

Similarly, overall shared area resource utilization by a group of ports may be expressed mathematically as:

$$GRC = \sum_{k=0}^{n-1} \sum_{j=0}^{t-1} P_k(Q_j) \qquad (2)$$

where:
n=Number of ports
t=Number of traffic classes
$P_k(Q_j)$=Shared-area utilization at storage region j of port storage resource k.

As previously discussed, a single descriptor may be allocated for each copy of the data packet to be transmitted and a collection of buffers may be allocated to store each data packet. In some embodiments, the counters and thresholds associated with each storage region (committed and shared areas) are byte values. In these embodiments, storage region thresholds may be set in bytes and storage region counters may be incremented or decremented in bytes based upon the size of the data packet to store. Alternatively, when descriptors are allocated, counters may be incremented based upon the number of copies of the data packet scheduled for transmission.

The egress pipeline 106 comprises a number of functional units associated with egress packet processing. These functional units include, among others, a packet queuing engine 108 and a transmit queue scheduler 110. Packet queuing engine 108 is responsible for determining which packets are enqueued at TX ports E0, E1, E2, E3 for subsequent transmission to the network. Transmit queue scheduler 110, on the other hand, implements one of several dequeuing algorithms that control the manner in which stored packets are dequeued and transmitted. At certain times, egress pipeline 106 may receive more packets for transmission than can be enqueued at a particular TX port or group of TX ports 116. In this situation, packet queuing engine 108 decides which packets to store and which packets to drop from the system. Generally speaking, this determination is made based upon information about the data packet and information about current resource utilization.

Initially, packet processor 100 may determine whether a threshold value based upon system-wide resource utilization has been exceeded. For example, this threshold may be based upon the total number of buffers used in the system or the total number of descriptors allocated. In some embodiments, threshold values associated with buffers and descriptors may be checked separately. If the current resource utilization exceeds a system-wide threshold value, the packet processor may have insufficient resources to store the data packet and the packet may be dropped.

Next, egress pipeline 106 may determine the storage region to which the data packet is directed ("destination storage region"). The destination storage region is the storage region that corresponds to the data packet's traffic class in the port storage area of the port at which the packet may be scheduled for transmission. When the destination storage region has been identified, egress pipeline 106 may detect the drop precedence value of the data packet. As previously mentioned, drop precedence values may be assigned on a per-packet basis upon ingress of the data packet and may be reassigned as the data packet progresses through an ingress pipeline.

If a data packet has a lowest drop precedence value, packet queuing engine 108 determines whether resources are available in the committed area of the destination storage region. This may be done by comparing the committed area counter to the committed area threshold using the values associated with the destination storage region. If the committed area counter does not exceed the committed area threshold at the destination storage region, the packet processor allocates resources to the data packet from the committed area of the destination storage region. Otherwise, processing of the data packet continues.

Packet queuing engine 108 may next determine whether a group-wide shared area threshold value has been exceeded at the group of ports. This may be accomplished by comparing the group-wide shared area resource utilization count (GRC) of Equation (2) to a maximum threshold value associated with the group of ports. If GRC exceeds the maximum threshold value, then shared area resources are not allocated at the group of ports and the packet may be dropped.

If a data packet does not have the lowest drop precedence value or if insufficient resources are available in the committed area of the destination storage region and the group-wide shared area threshold has not been exceeded, packet queuing engine 108 determines whether resources can be allocated to the data packet from the shared area of the destination storage region. As an initial matter, the packet queuing engine 108 may compare the group-wide shared area counter associated with the destination storage region to its corresponding threshold value. This may be done by comparing the group-wide shared area counter ($GS_x$) of Equation (1) that matches the traffic class of the data packet with its corresponding threshold value. If $GS_x$ exceeds the group-wide shared area threshold value associated with the traffic class of the data packet, then the data packet may be dropped. Otherwise, processing of the data packet continues.

If the group-wide shared area threshold has not been exceeded for the traffic class associated with the data packet, a final comparison may be made. Packet queuing engine 108 may compare a shared-area counter to a shared-area threshold associated with the destination storage region. The shared-area counter and shared-area threshold used in the comparison may be identified based upon the drop precedence value of the data packet. If the shared-area counter exceeds the shared-area threshold, the data packet will be dropped. Otherwise, the data packet will be stored.

Figure 3:
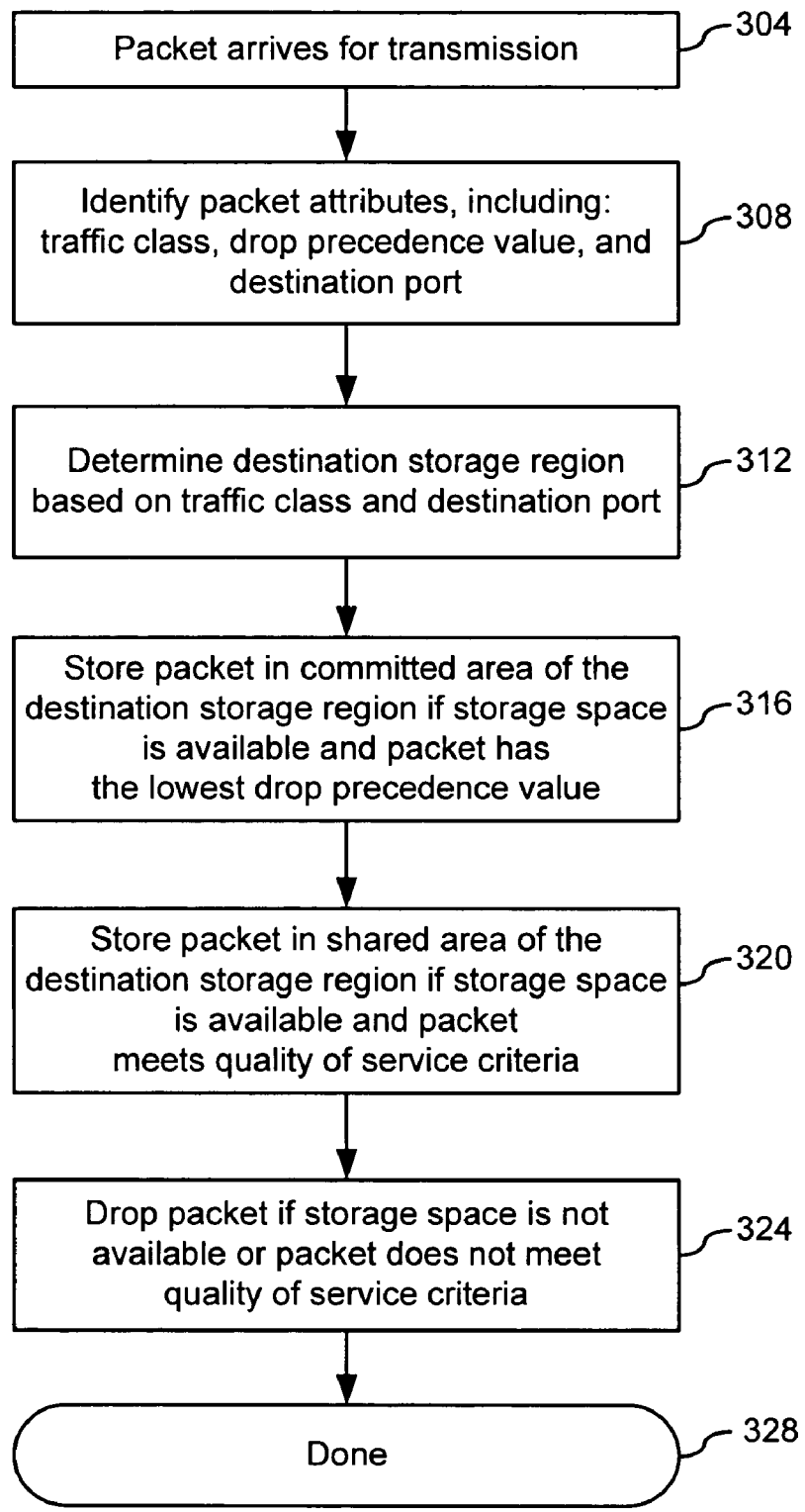
FIG. 3 is a simplified flow diagram of various steps performed by a packet processor to allocate resources according to one embodiment of the present invention.

FIG. 3 is a simplified flow diagram of various steps performed by a packet processor to allocate resources to a data packet according to one embodiment of the present invention. In a first step 304, the packet processor receives an input data packet. This may occur at a stage in an egress pipeline after one or more processing operations has been performed on the data packet.

In a next step 308, the packet processor retrieves quality of service information and destination port information for the data packet. The quality of service information includes a traffic class and a drop precedence value. This information may be included as part of the data packet's QoS profile. The destination port specifies a particular port in a group of ports. The packet processor uses this information to determine a destination storage region for the data packet 312.

After the packet processor determines a destination storage region for the data packet, it may decide whether to (1) allocate resources to the data packet from the committed area of the destination storage region, (2) allocate resources to the data packet from the shared area of the destination storage region, or (3) drop the data packet. The process of allocating resources may involve assigning a collection of egress port buffers to store the data packet while it waits to be transmitted and may also involve assigning one or more descriptors for identifying copies of the data packet stored in the buffers. In some embodiments, these resources are organized as linked-lists.

Data packets with a lowest drop precedence value may be stored in the committed area of the destination storage region if sufficient resources are available 316. These packets, for example, may represent traffic covered by a Service Level Agreement (SLA) wherein a network operator has guaranteed to provide a certain amount of bandwidth.

If insufficient resources are available in the committed area of the destination storage region for a data packet with the lowest drop precedence value, the packet processor determines whether to store the packet in a shared resource area 320 of the destination storage region. Similarly, the packet processor determines whether to allocate resources from the shared area to data packets with higher drop precedence values 320. In some embodiments, the packet processor maintains a plurality of counters associated with resource utilization in both the committed and shared areas of the destination storage region and compares these counters to a plurality of related threshold values. The packet processor may then allocate resources based on the results of these comparisons. For example, the packet processor may separately track resource utilization in the committed and shared areas with one or more counters. These counters may be updated as resources are allocated or subsequently returned to the system. In some embodiments, a separate counter is maintained in the shared area of each storage region for each drop precedence value associated with data packets. By comparing these counters to one or more threshold values, the packet processor may determine whether to allocate additional resources on a per-packet basis and may thereby enforce quality of service requirements.

In a final step 324, the packet processor may drop a data packet. A packet may be dropped if insufficient resources are available in the committed and/or shared resource areas of the destination storage region or when allocating resources would adversely impact quality of service. For example, during periods of network congestion, it may be important to provide a higher priority to packets representing certain types of traffic. Among other possibilities, this can be accomplished by adjusting the threshold for that type of data packet in the shared area of the destination storage region to thereby increase the probability that resources will be allocated to the packet.

Figure 4:
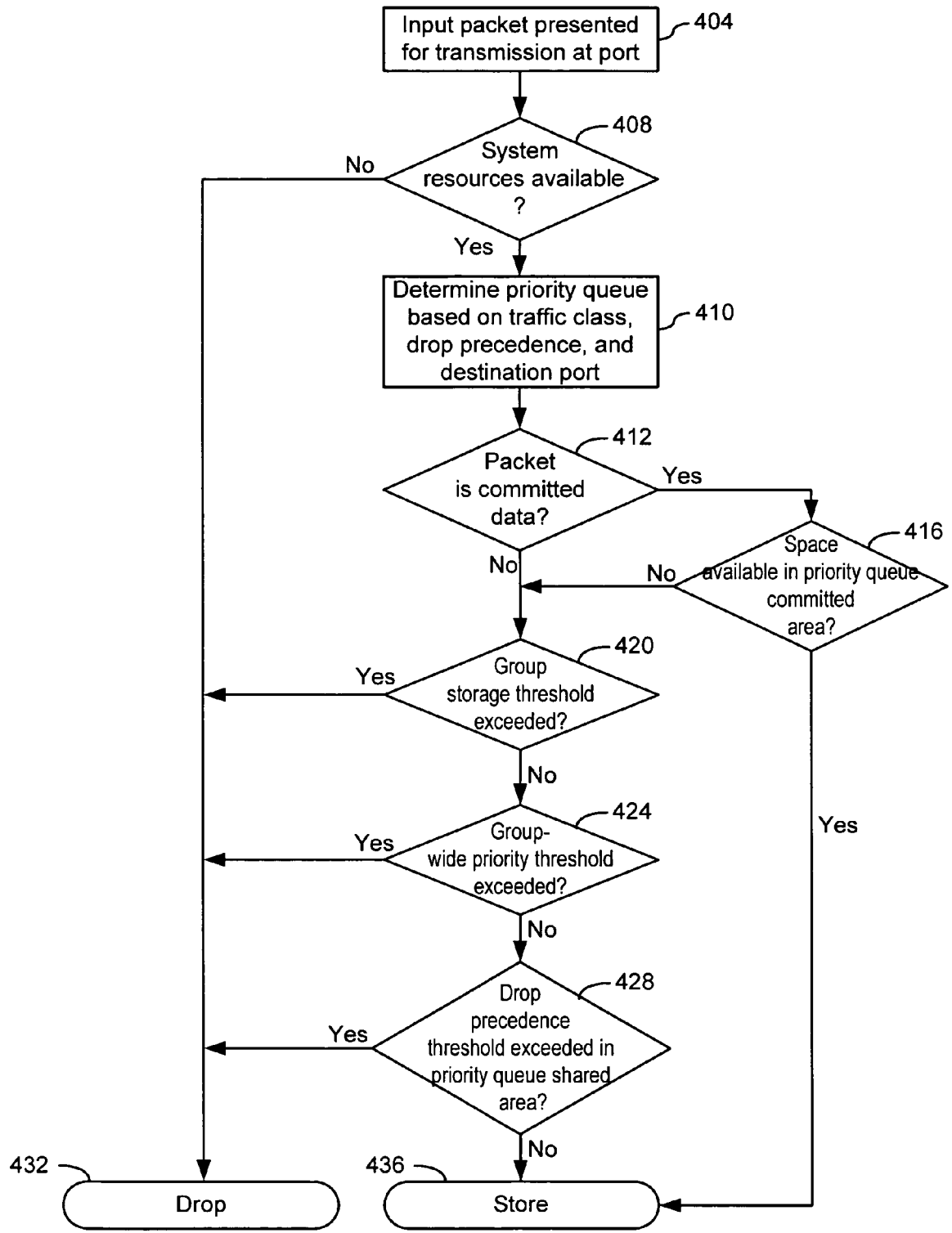
FIG. 4 is a flow chart of various steps for allocating resources in a packet processor according to an alternative embodiment of the present invention.

FIG. 4 is a flowchart illustrating a process for allocating resources to a data packet according to an alternative embodiment of the present invention. In a first step 404, an input data packet is presented for transmission at a destination port. The packet processor determines whether to allocate resources for the data packet or drop the data packet. For example, the packet processor may allocate buffers to store the data packet until it can be transmitted to the network. Similarly, the packet processor may allocate one or more descriptors to the data packet from internal resources. However, before allocating resources, the packet processor may first check system-wide resource utilization. If system-wide resource utilization exceeds a predetermined threshold value 408, the data packet may be dropped 432.

The packet processor maintains traffic class and drop precedence information about each data packet for use in determining the priority of the data packet. These values may be represented by QoS profile and may change as the data packet is processed. In addition, the packet processor maintains information about the port and group of ports at which the data packet is scheduled for transmission. In a next step 410, the packet processor determines a priority queue based upon the traffic class and destination port associated with the data packet.

The packet processor next determines whether a data packet represents committed data 412 and should therefore be accorded a highest level of service. In some embodiments, this determination is made based upon the drop precedence value of the data packet. For example, the data packet might be part of traffic for which the network operator has committed to provide guaranteed bandwidth or other quality of service considerations. In this case, the packet processor first determines whether resources are available in the committed resource area of the priority queue corresponding to the data packet 416. If resources are available, the data packet is stored in the committed area of the priority queue 436.

If a data packet was not stored in the committed area of the priority queue, the packet processor may check whether a group storage threshold corresponding to overall shared area resource utilization has been exceeded at the group of ports that includes the destination port 420. If the threshold corresponding to group-wide shared area resource utilization has been exceeded, resources will not be allocated and the data packet may be dropped 432. However, processing continues if the group-wide shared area threshold has not been exceeded.

Data packets that do not represent committed data or committed data packets for which sufficient committed area resources are not available may have resources allocated from a shared area of the corresponding priority queue. Allocating resources from the shared area of the priority queue may involve a two-part process. First, the packet processor may determine whether a combined shared-area threshold associated with the traffic class of the data packet has been exceeded. The packet processor may compare a current shared area resource utilization by all packets having the same traffic class in the group of ports to a group-wide priority threshold value 424. If allocating additional resources for a data packet with a particular traffic class would exceed the group-wide priority threshold, the packet will be dropped 432. This determination is independent of the destination port of the data packet.

If it is determined that the group-wide priority threshold has not been exceeded, the packet processor may make another determination. In this case, the packet processor may compare a shared area counter maintained at the priority queue with a predetermined threshold value 428. The counter and threshold may be based on the drop precedence value of the data packet. If resources allocated from the shared area of the priority queue to data packets with the drop precedence value do not exceed the predetermined threshold value, the data packet will be stored in the shared area of the priority queue 436. Otherwise, the data packet will be dropped and processing may terminate.

While the principles of the disclosure have been described above in connection with specific apparatuses and methods, it is to be clearly understood that this description is made only by way of example and not as limitation on the scope of the invention.

What is claimed is:

1. A method of processing packets in a network, the method comprising:
   receiving, at a particular port included in a group of ports, a packet characterized by a drop precedence value;
   determining whether to store the packet based on a comparison between a group count and a group count threshold, the group count indicative of a size of packets stored in a subset of all of a plurality of storage regions, the subset of the plurality of storage regions corresponding to the group of ports, and the group count threshold indicative of a size of the subset of the plurality of storage regions corresponding to the group of ports; and
   if the packet is to be stored:
      determining a destination storage region for storing the packet, said determined destination storage region being included in the subset of the plurality of storage regions;
      storing the packet in a committed area of the determined destination storage region if the packet has a first drop precedence value and if an available storage space in the committed area is greater than a first threshold; and
      storing the packet in a shared area of the determined destination storage region if the packet is not stored in the committed area and if an available storage space in the shared area is greater than a second threshold defined by the packet's drop precedence value.

2. The method of claim 1, further comprising dropping the packet if the packet is not stored in the committed area or the shared area of the determined destination storage region.

3. The method of claim 2, wherein determining the destination storage region for storing the packet is based upon a traffic class value of the packet, said traffic class value being one of N different traffic class values.

4. The method of claim 3, further comprising:
   dropping the packet if the group count exceeds the group count threshold; and
   updating the group count if the packet is stored in the committed area or the shared area of the determined destination storage region.

5. The method of claim 4, further comprising:
   maintaining a global shared count representative of a size of packets stored in a shared area of each storage region associated with the group of ports;
   comparing the global shared count to a global shared threshold if the packet is to be stored in the shared area of the determined destination storage region;
   dropping the packet if the global shared count exceeds the global shared threshold; and updating the global shared count if the packet is stored in the shared area of the determined destination storage region.

6. The method of claim 5, further comprising:
forming N groups from packets stored in the shared area of each storage region associated with the group of ports according to a traffic class of each packet;
forming N counts each representative of a size of packets in a different one of the N groups;
comparing a particular count from the N counts to a predetermined threshold;
dropping the packet if said particular count exceeds the predetermined threshold value and the packet is to be stored in the shared area of the determined destination storage region; and
updating said particular count if the packet is stored in the shared area of the determined destination storage region.

7. The method of claim 1, wherein available storage space in the committed area and the shared area is measured in bytes.

8. The method of claim 7, wherein the available storage space in the committed area is reduced by a size of the packet if the packet is stored in the committed area of the determined destination storage region and the available storage space in the shared area is reduced by the size of the packet if the packet is stored in the shared area of the determined destination storage region.

9. The method of claim 1, wherein storing the packet includes dividing the packet among one or more buffers according to a size of the packet and forming a linked list of said one or more buffers.

10. The method of claim 1, wherein storing the packet includes allocating one or more descriptors to the packet.

11. A network device for processing packets, the network device comprising:
a plurality of ports;
a storage resource associated with the plurality of ports, the storage resource comprising a plurality of storage regions; and
an egress pipeline configured to determine a destination storage region for storing a packet, the packet ingressed at or to be egressed from a particular port included in a group of ports, the group of ports being a subset of the plurality of ports and corresponding to a subset of the plurality of storage regions, the destination storage region included in the subset of the plurality of storage regions, and said egress pipeline comprising a packet queuing engine configured to:
determine whether to store the packet based on a comparison between a group count and a group threshold, the global count indicative of a size of packets stored in the subset of a plurality of storage regions and the group count threshold indicative of a size of the subset of the plurality of storage regions;
wherein if the packet is to be stored:
store the packet in a committed area of the determined destination storage region if the packet has a first drop precedence value and if an available storage space in the committed area is greater than a first threshold and to store the packet in a shared area of the determined destination storage region if the packet is not stored in the committed area and if an available storage space in the shared area is greater than a second threshold defined by the packet's drop precedence value.

12. The network device of claim 11, wherein the packet queuing engine is further configured to drop the packet if the packet is not stored in the committed area or the shared area of the determined destination storage region.

13. The network device of claim 12, wherein the egress pipeline determines the destination storage region based upon a traffic class value of the packet, said traffic class value being one of N different traffic classes.

14. The network device of claim 13, wherein the packet queuing engine is further configured to drop the packet if the group count exceeds the group count threshold and to update the group count if the packet is stored in the committed or the shared area of the determined destination storage region.

15. The network device of claim 14, wherein the packet queuing engine is further configured to maintain a global shared count representative of a size of packets stored in a shared area of each storage region associated with the group of ports and to compare the global shared count to a global shared threshold if the packet is to be stored in the shared area of the determined destination storage region, the packet queuing engine being further configured to drop the packet if the global shared count exceeds the global shared threshold and to update the global shared count if the packet is stored in the shared area of the determined destination storage region.

16. The network device of claim 15, wherein the packet queuing engine is further configured to form N groups from packets stored in the shared area of each storage region according to traffic class value and to form N counts each representative of a size of packets in a different one of the N groups of packets, the packet queuing engine being further configured to compare a particular count from the N counts to a predetermined threshold, and to drop the packet if said particular count exceeds the predetermined threshold and the packet is to be stored in the shared area of the determined destination storage region, the packet queuing engine being further configured to update said particular count if the packet is stored in the shared area of the determined destination storage region.

17. The network device of claim 11, wherein the available storage space in the committed area and the shared area is measured in bytes.

18. The network device of claim 17, wherein the available storage space in the committed area of the determined destination storage region is reduced by a size of the packet if the packet is stored in the committed area of the determined destination storage region, and wherein the available storage space in the shared area of the determined destination storage region is reduced by the size of the packet if the packet is stored in the shared area of the determined destination storage region.

19. The network device of claim 11, wherein the storage resource allocated to the plurality of ports includes buffers, and wherein the packet is stored by allocating one or more buffers according to a size of the packet and forming a linked list of said one or more buffers.

20. The network device of claim 11, wherein the storage resource allocated to the plurality of ports includes descriptors and wherein the packet is stored by creating one or more descriptors associated with the packet.

21. A network device for processing packets, the network device comprising:
means for receiving a packet at a particular port included in a group of ports, the packet characterized by a drop precedence value;
means for determining whether to store the packet based on a comparison between a group count and a group count threshold, the group count indicative of a size of packets stored in a subset of all of a plurality of storage regions, the subset of the plurality of storage regions corresponding to the group of ports and the group count threshold indicative of a size of the subset of the plurality of storage regions corresponding to the group of ports;

means for determining a destination storage region for storing the packet, said determined destination storage region included in the subset of the plurality of storage regions;

means for storing the packet in a committed area of the determined destination storage region if the packet has a first drop precedence value and if an available storage space in the committed area is greater than a first threshold; and means for storing the packet in a shared area of the determined destination storage region if the packet is not stored in the committed area and if an available storage space in the shared area is greater than a second threshold defined by the packet's drop precedence value.

22. The network device of claim 21, further comprising means for dropping the packet if the packet is not stored in the committed area or the shared area of the determined destination storage region.

23. The network device of claim 22, wherein the means for determining the destination storage region for storing the packet is operative in response to a traffic class value of the packet, said traffic class value being one of N different traffic class values.

24. The network device of claim 23, further comprising:
means for dropping the packet if the group count exceeds the group count threshold; and
means for updating the group count if the packet is stored in the committed area or the shared area of the determined destination storage region.

25. The network device of claim 24, further comprising:
means for maintaining a global shared count representative of a size of packets stored in a shared area of each storage region associated with the group of ports;
means for comparing the global shared count to a global shared threshold if the packet is to be stored in the shared area of the determined destination storage region;
means for dropping the packet if the global shared count exceeds the global shared threshold; and
means for updating the global shared count if the packet is stored in the shared area of the determined destination storage region.

26. The network device of claim 25, further comprising:
means for forming N groups from packets stored in the shared area of each storage region associated with the group of ports according to a traffic class of each packet;
means for forming N counts each representative of a size of packets in a different one of the N groups;
means for comparing a particular count from the N counts to a predetermined threshold;
means for dropping the packet if said particular count exceeds the predetermined threshold value
and the packet is to be stored in the shared area of the determined destination storage region; and means for updating said particular count if the packet is stored in the shared area of the determined destination storage region.

27. The network device of claim 21, wherein available storage space in the committed area and the shared area is measured in bytes.

28. The network device of claim 27, wherein available storage space in the committed area is reduced by a size of the packet if the packet is stored in the committed area of the determined destination storage region and the available storage space in the shared area is reduced by the size of the packet if the packet is stored in the shared area of the determined destination storage region.

29. The network device of claim 21, wherein storing the packet includes dividing the packet among one or more buffers according to a size of the packet and forming a linked list of said one or more buffers.

30. The network device of claim 21, wherein storing the packet includes allocating one or more descriptors to the packet.

31. A non-transitory computer-readable storage medium storing a computer program that includes instructions for processing packets, the instructions causing a processor to:
determine whether to store a packet, characterized by a drop precedence value, based on a comparison between a group count and a group count threshold, the group count indicative of a size of packets stored in a subset of all of a plurality of storage regions corresponding to the group of ports including a particular port at which the packet was ingressed or from which the packet is to be egressed, and the group count threshold indicative of a size of the subset of the plurality of storage regions corresponding to the group of ports;
if the packet is to be stored:
determine a destination storage region for storing the packet, said determined destination storage region included in the subset of the plurality of storage regions;
store the packet in a committed area of the determined destination storage region if the packet has a first drop precedence value and if an available storage space in the committed area is greater than a first threshold; and
store the packet in a shared area of the determined destination storage region if the packet is not stored in the committed area and if an available storage space in the shared area is greater than a second threshold defined by the packet's drop precedence value.

32. The non-transitory computer-readable storage medium of claim 31, further comprising instructions for causing the processor to drop the packet if the packet is not stored in the committed area or the shared area of the determined destination storage region.

33. The non-transitory computer-readable storage medium of claim 32, wherein the instructions for causing the processor to determine the destination storage region for storing the packet are operative in response to a traffic class value of the packet, said traffic class value being one of N different traffic class values.

34. The non-transitory computer-readable storage medium of claim 33, further comprising instructions to cause the processor to:
drop the packet if the group count exceeds the group count threshold; and
update the group count if the packet is stored in the committed area or the shared area of the determined destination storage region.

35. The non-transitory computer-readable storage medium of claim 34, comprising instructions to cause the processor to:
maintain a global shared count representative of a size of packets stored in a shared area of each storage region associated with the group of ports;
compare the global shared count to a global shared threshold if the packet is to be stored in the shared area of the determined destination storage region; and
drop the packet if the global shared count exceeds the global shared threshold; and update the global shared count if the packet is stored in the shared area of the determined destination storage region.

36. The non-transitory computer-readable storage medium of claim 35, further comprising instructions to cause the processor to:

form N groups from packets stored in the shared area of each storage region associated with the group of ports according to a traffic class of each packet;

form N counts each representative of a size of packets in a different one of the N groups; compare a particular count from the N counts to a predetermined threshold;

drop the packet if said particular count exceeds the predetermined threshold value and the packet is to be stored in the shared area of the determined destination storage region; and update said particular count if the packet is stored in the shared area of the determined destination storage region.

37. The non-transitory computer-readable storage medium of claim 31, wherein available storage space in the committed area and the shared area is measured in bytes.

38. The non-transitory computer-readable storage medium of claim 37, wherein available storage space in the committed area is reduced by a size of the packet if the packet is stored in the committed area of the determined destination storage region and the available storage space in the shared area is reduced by the size of the packet if the packet is stored in the shared area of the determined destination storage region.

39. The non-transitory computer-readable storage medium of claim 31, wherein storing the packet includes dividing the packet among one or more buffers according to a size of the packet and forming a linked list of said one or more buffers.

40. The non-transitory computer-readable storage medium of claim 31, wherein storing the packet includes allocating one or more descriptors to the packet.

* * * * *